2 Sheets—Sheet 1.

G. SINCLAIR.

Apparatus for Pulping Wood, &c.

No. 4,771. Reissued Feb. 27, 1872.

Witnesses.

Gustave Dittenhöfer

D. S. Mabee

Inventor.

G. Sinclair

Per Munn & Co

Attorneys.

2 Sheets—Sheet 2.

G. SINCLAIR.

Apparatus for Pulping Wood, &c.

No. 4,771. Reissued Feb. 27, 1872.

Witnesses.

Gustave Dieterich

L. S. Graber

Inventor

G. Sinclair

Per Munn & Co

Attorneys.

UNITED STATES PATENT OFFICE.

GEORGE SINCLAIR, OF LEITH, SCOTLAND.

IMPROVEMENT IN APPARATUS FOR TREATING PAPER STOCK

Specification forming part of Letters Patent No. 110,873, dated January 10, 1871; reissue No. 4,771, dated February 27, 1872.

Specification describing certain Improvements in a new and improved construction and arrangement of Boiler and Apparatus for the treating and boiling of split-wood, woody fibers, or other vegetable fibrous material, for the production of Paper-Pulp, invented by GEORGE SINCLAIR, of Leith, in the county of Edinburgh, Scotland.

This invention consists in an improved construction and arrangement of the parts of boilers or vessels for containing fibrous wood or other vegetable material, to be treated by direct action or radiation of heat from the flame or gaseous products of combustion from ordinary forms of fuel and furnaces through an outer shell or case; and the invention further substantially consists in making the said outer shell or boiler, for the said purposes, in a long cylindrical and strong form with a thin inner closely-perforated casing or vessel D, supported at a short distance from and all round its inner heating or radiating surface, and in the arrangement of a central perforated tube within the boiler, for the purpose of causing a more forcible or free circulation of the liquid currents by passing up the narrow annular space between the outer and inner vessel, and vertically and laterally through the fibrous material, and down through the central tube, and in the provision of a supply-chamber; and also in the arrangement of obstructing plates, forming a spiral flue in the annular space or combustion-chamber between the boiler and the wall of the furnace or combustion-chamber, all as hereinafter more particularly described.

Figure 1:
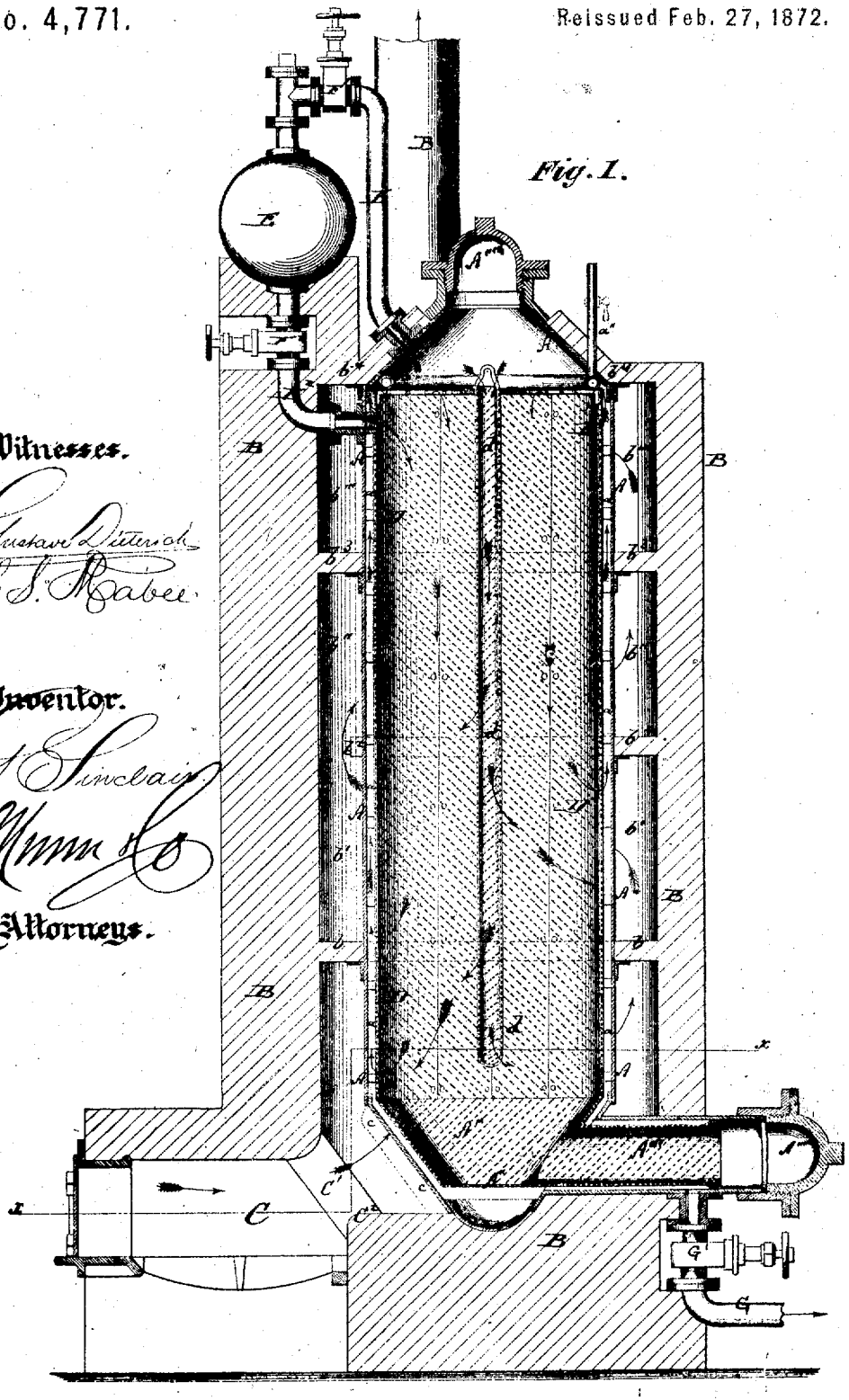
Figure 2:
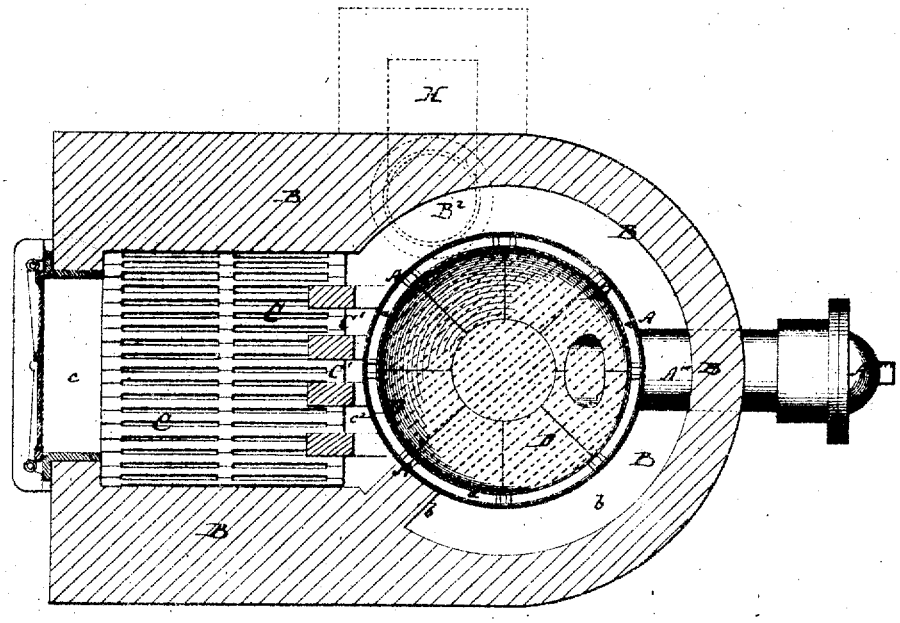

In the accompanying drawing, Figure 1 is a vertical section of my new and improved boiler. Fig. 2 is a horizontal section of the same taken on the line *x* in Fig. 1.

Similar letters of reference indicate corresponding parts.

The main shell A of the improved pulp-preparing boiler is of a long, narrow, cylindrical shape, of such a diameter that it will be of sufficient strength, and allow the contents placed within it to be easily heated through from the outer circumference. I prefer to construct it with a diameter of from two to four feet, and with a length of from three to six diameters, and to make it of the best malleable iron or steel-boiler plate, secured by double rows of rivets at the joints. The ends A′ A″ of this boiler are of conical or hollow semi-spherical form, and so strongly made as to stand the great pressure of from two to three hundred pounds, due to the heat required within. In the top of the boiler is an opening for filling the boiler, while the bottom of the same is connected with a discharging-pipe, A‴. The top opening A′ can be closed by a screw-cap, A⁗, with a similar cap, A′⁗, can be used for closing the pipe A‴. These caps can be provided with turned flanges made fluid-pressure tight by fine grooves and rings of copper wire, or other equivalent simple joints; or otherwise the flanges may be tightened by screw-bolts passed through them, or other equivalent suitable fastening. The main boiler A is placed within a confined walled heating-flue or chamber, B, of brick-work, having the heated products of combustion from an ordinary furnace, C, passed into and up through the chamber B, so as to act on the outer surface of the boiler A. Within the boiler A is set up an inner casing or vessel, D, formed of thin sheet-metal plates, closely perforated with small holes, or of strong wire-cloth; in either case it is secured to the outer shell or vessel A by small short stays or studs, or other equivalent fastenings, to retain the perforated vessel an inch or two from the interior of the outer heating vessel A, all round and opposite to where the heat impinges or is imparted to it. Thus the outer hot shell A is prevented from touching, overheating, or burning the fibrous materials which are all placed and kept within the inner perforated vessel D, and so as to heat the liquor or "lyes" within the narrow annular space *a*, between the outer and inner vessels A D, and cause it to circulate freely up the space *a*, over the open top, down the center of the perforated vessel D, and through the wood material within it, and out through the openings or perforations of the same toward the bottom into the annular space *a* again, as indicated by the arrows, all so as to pass vertically and laterally through the body of the fibrous materials being treated, and thus thoroughly boil and reduce them. In some cases the fibrous material is apt to pack so closely as to prevent the said free circulation of the liquid through it, and then the object of the treatment is only partly attained. To obviate this result or to insure the thorough permeation of the material I have provided a long closely-perforated tube or pipe, *d*, down the center of the vessel D and materials in it, as shown in Fig. 1, by preference close or perforated at the top and open at the lower end, all for the purpose of insuring the passage of the liquid currents down and out laterally through the perforations of said pipe and through the materials being treated, as indicated by the arrows in Fig. 1. The upper end of the boiler is made to project vertically through the brickwork at the top, for the convenience of filling the vessel D, while the discharge-pipe A''', projecting laterally out through the brickwork at the lower end of the inner casing D, and near that of the vessel A, for the more easy withdrawal of the solid fibrous material from the inner vessel D, into other portable or stationary apparatus for subsequent treament. A small supply vessel, E, by preference of a spherical or it may be of a strong cylindrical form, is placed above the boiler A and structure B. The upper parts of both vessels A and E are connected by a small pipe, $E^1$, while another small pipe, $E^2$, leads from the bottom of the supply-vessel E into the side of the boiler A and inner vessel D, both pipes $E^1$ $E^2$ being provided with controlling-valves $F^1$ $F^2$.

The boiler A is built vertically in the heating-chamber B, with an annular flue-heating space all round it, and is set by its lower strong conical end on the brickwork. The flame and gaseous products of combustion are led into the bottom of the heating-furnace through the oblong holes $C^1$ in the flame-wall $C^2$. Thence the same pass once round the boiler A, and rise through an opening in the flue division roof *b* into the space $b^1$, and thence through the like division roofs or otherwise, instead of the undulating flue and spaces $b^2$ $b^3$ and $b''$ $b'''$, till they reach the flue $B^2$ and chimney $B^3$, all as indicated by the arrows.

The operation is as follows: The entrance and charging-cover A'''' is screwed off, and the chipped wood or wood shavings, esparto, or other fibrous material to be treated is put into and retained within the inner perforated or wire-cloth vessel D, with a sufficient charge of caustic soda, or strength of the proper alkaline liquid desired, so as to fill the vessel A to the very top with the liquid in the usual proportions. The cover is then firmly screwed down, and the small vessel E filled with water or alkaline liquid, so as to keep the boiler A D always full of the circulating liquid—that is, when this vessel is used—but it may be dispensed with without affecting the working. The fire is then lighted in the furnace C and kept burning slowly, the heated products of combustion passing over the flame-bridge $C^2$, and round and up the heating space B and openings $b'$ $b''$ $b'''$ between the outer heating-shell A of the boiler A D and the brick wall, to and out through the chimney or funnel $B^2$ into the air. The products of combustion serve thereby to boil the fibrous materials and alkaline liquors all under the pressure required, and for the time necessary to reduce the materials to the usual and well-known loose or pulpy degree or consistency desired, the boiling liquid being in continuous circulation through the fibrous material being treated, as hereinbefore described and indicated by the arrows, after which the alkaline liquids are drawn off by the small blow-off pipe G and valve G', bolted to the lower part of the discharge-pipe A'''. The lid A''''' on the large discharge-duct A''' may then be screwed off, and the treated fibrous materials withdrawn from the inner perforated vessel D into any other vessel for further treatment; or, otherwise, when desired, both the alkaline liquid and fibrous materials may be withdrawn through the discharge-duct and doors A''' A'''''.

A small water-pipe, *a''*, with stop-cock, may be connected by a branch or branches to the upper part of the outer shell A of these duplex boilers A D, so as to wash the annular circulating space *a* between the outer and inner shells A and D occasionally, when desired, after one or more boilings or discharges of the materials.

Having thus described my invention, what I claim as new, and desire to secure by Letters Patent, is—

1. The perforated tube *d*, arranged centrally and longitudinally of the boiler A, and extending from top to bottom, as shown and described, and for the purpose specified.

2. The perforated plates *b* $b^2$ $b^3$, arranged as shown and described, with reference to the boiler A and furnace-chamber, as shown and described.

3. The arrangement of the vessel E and pipes $E^1$ $E^2$ with reference to the boiler D and furnace-wall B, as shown and described, for the purpose specified.

4. The closely-perforated internal shell or case D, and the close or imperforate boiler A, arranged in a vertical position, and having the annular space *a* between them, as shown and described, whereby the upward side currents and central downward currents of liquid and heat are produced, as and for the purpose specified.

5. The conical caps or ends A'''' A''''', attached to the boiler, as shown and described, to close the filling mouth-piece at top of boiler and discharge aperture at bottom, as specified.

6. The combination in a paper-pulp boiler of the vertical central perforated tube *d* and perforated cylinder or casing D, substantially as specified, for the purpose of producing a current of the liquid laterally through the material being treated, as set forth.

The above specification of my invention signed by me this 18th day of October, 1871.

GEORGE SINCLAIR.

Witnesses:
ROBERT SANDISON LAIRD,
*No. 1 Abbey Mount, Edinburgh.*
GEORGE FRASER,
*94 Constitution Street, Leith.*